(12) United States Patent
Nowak et al.

(10) Patent No.: US 9,972,025 B2
(45) Date of Patent: May 15, 2018

(54) SURVEY SEGMENTATION

(71) Applicant: FACEBOOK, INC., Menlo Park, CA (US)

(72) Inventors: Michael Nowak, San Francisco, CA (US); Ye Lu, Menlo Park, CA (US); Breno Roberto, Santa Clara, CA (US); Flavio Oliveira, Menlo Park, CA (US); Brent Bannon, San Jose, CA (US); Wojciech Galuba, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 881 days.

(21) Appl. No.: 13/906,313

(22) Filed: May 30, 2013

(65) Prior Publication Data

US 2014/0358636 A1    Dec. 4, 2014

(51) Int. Cl.
*G06Q 30/02* (2012.01)
*G06Q 50/10* (2012.01)
*G06Q 50/00* (2012.01)

(52) U.S. Cl.
CPC ......... *G06Q 30/0203* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 4,603,232 A | * | 7/1986 | Kurland | G06K 17/0022 379/92.04 |
| 5,740,035 A | * | 4/1998 | Cohen | G06Q 30/0203 235/384 |
| 6,175,833 B1 | * | 1/2001 | West | G06Q 30/0601 434/323 |
| 6,477,504 B1 | * | 11/2002 | Hamlin | G06Q 10/06 455/2.01 |
| 6,513,014 B1 | * | 1/2003 | Walker | H04N 21/25891 705/1.1 |
| 6,539,392 B1 | * | 3/2003 | Rebane | G06Q 30/02 705/26.1 |
| 8,712,824 B1 | * | 4/2014 | Julian | G06Q 30/0201 705/14.4 |
| 2005/0071219 A1 | * | 3/2005 | Kahlert | G06Q 10/06 705/7.32 |
| 2005/0075919 A1 | * | 4/2005 | Kim | G06Q 10/06316 705/7.26 |
| 2006/0036857 A1 | * | 2/2006 | Hwang | G06F 21/31 713/168 |
| 2006/0178193 A1 | * | 8/2006 | Hunter | G06Q 30/02 463/17 |

(Continued)

*Primary Examiner* — Leland Marcus
(74) *Attorney, Agent, or Firm* — Keller Jolley Preece

(57) ABSTRACT

An embodiment of a system and method of surveying users on a social networking system is described which limits the frequency in which any one user is surveyed. Users are assigned into a multi-layered survey pool based on a hash value derived from a user identification number for the online social network that is assigned to the user. Users are randomly offered the opportunity to take a survey, and the subject matter of the survey is at least partially determined by the layer from which the survey obtains its sample populace.

19 Claims, 10 Drawing Sheets

Survey Layer Rotation

(56) References Cited

U.S. PATENT DOCUMENTS

| | | | |
|---|---|---|---|
| 2007/0192166 A1* | 8/2007 | Van Luchene | G06F 17/30646 705/14.54 |
| 2007/0233503 A1* | 10/2007 | Meyer | G06Q 30/08 705/37 |
| 2008/0028313 A1* | 1/2008 | Ebert | G06Q 30/02 715/730 |
| 2008/0085675 A1* | 4/2008 | Rao | G06Q 30/02 455/2.01 |
| 2008/0119131 A1* | 5/2008 | Rao | G06Q 30/02 455/3.04 |
| 2008/0177600 A1* | 7/2008 | McCarthy | G06Q 10/0639 705/7.33 |
| 2008/0288276 A1* | 11/2008 | Harris | G06Q 30/02 705/7.32 |
| 2008/0313010 A1* | 12/2008 | Jepson | G06Q 30/02 705/7.32 |
| 2009/0106084 A1* | 4/2009 | Or | G06Q 30/0204 705/7.33 |
| 2009/0276233 A1* | 11/2009 | Brimhall | G06Q 40/025 705/38 |
| 2010/0077095 A1* | 3/2010 | Wong | G06Q 30/02 709/231 |
| 2011/0182424 A1* | 7/2011 | Grube | G06F 11/1076 380/43 |
| 2014/0143157 A1* | 5/2014 | Jeffs | G06Q 30/016 705/304 |
| 2014/0280571 A1* | 9/2014 | Tarbox | G06Q 50/01 709/204 |
| 2014/0359298 A1* | 12/2014 | Carlson | H04L 9/3247 713/176 |

* cited by examiner

Ad Hoc Survey to User Assignment

SURVEY SEGMENTATION

FIELD

Embodiments of the invention relate to online social networking system; and more specifically, to surveying users of an online social networking system.

BACKGROUND

A social networking system can provide a wealth of knowledge as to the likes, dislikes, and preferences of the users of the social network. Users of a social networking system often use the social network to provide such personal preference information to users to which they are connected. In some instances, it may be valuable to directly poll or survey the various users of the social networking system as to their general attitudes towards specific questions, such as products or services that are generally commercially available. Additionally, the social networking system can be enhanced by seeking specific feedback from the users of the system as to the opinion of those users as to various aspects of the use or functioning of the social networking system.

The knowledge that can be attained by surveying the user base of social networking system can create an incentive to over-survey. If a user population is over-surveyed, however, the user experience may suffer. While a user may be willing to answer a limited number of surveys over a finite period of time, but continuously surveying the same user, or user group, may make the user reluctant to make use of the social networking system. Additionally, excessive surveying may negatively impact the quality of information gathered during the survey.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
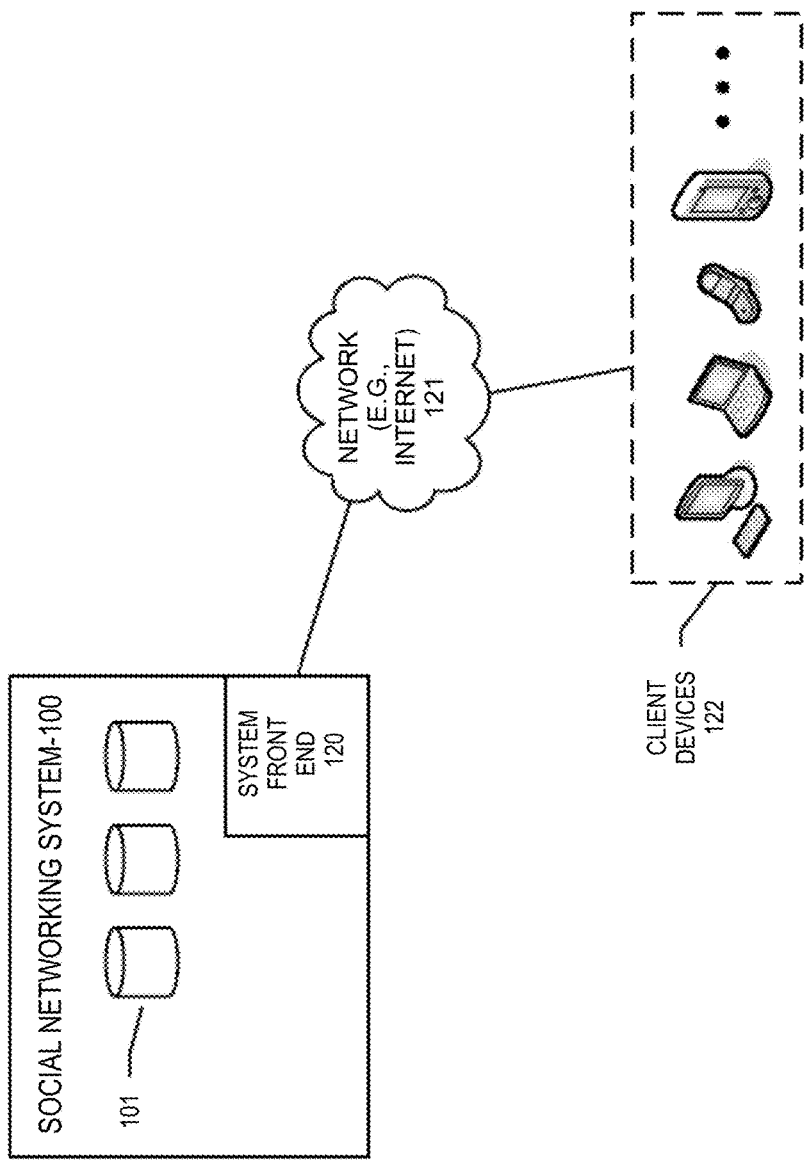
FIG. 1 is an example network environment of a social networking system according to an embodiment of the invention.

In the following description, numerous specific details are set forth for various embodiments of a system and associated methods of surveying users on a social networking system while limiting the frequency in which a single user is surveyed. While many specific details are set forth, it is understood that embodiments of the invention may be practiced without some of these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

When conducting user surveys on a user populace, it is advantageous to limit the frequency in which any individual user is surveyed. Repeatedly surveying the same users will harm the users' experience, and reduce the quality of data gathered by the survey. To limit the frequency in which any single user is surveyed, the users that eligible to be surveyed are assigned to various logical groups, or "layers" within a multi-layered survey pool. Groups of surveys are associated with the various layers, and the users assigned to the various layers are periodically offered the opportunity to take one of the surveys associated with the user's assigned layer. In one embodiment, the layers of the survey pool correspond to the subject matter of surveys offered to users assigned to the layer of the survey pool. The subject matter of the various layers can differ amongst the various embodiments. For example, in one embodiment, a layer of the survey pool contains users that may be surveyed about various features of the social networking system, while an additional layer of the survey pool contains users that may be surveyed about products commonly used by users of the social networking system. In one embodiment, after a user is offered the opportunity to take a survey, the user enters a cool-down period, during which the user is not offered the opportunity to take additional surveys.

The number of logical survey layers can vary amongst the various embodiments. The types of survey layers include a main survey layer, which is used to gather general information on user satisfaction with the social networking system. Additionally, the main survey layer can also be used to gather user sentiment regarding tests or changes to various aspects of the social networking system. Additionally, one or more layers can be used for product surveys, to gather specific user data on the various products of the social networking system available to users of the system, such as the ability to exchange messages and share media with members of a user's social network. Fewer surveys are available in the product layers in comparison to the main survey layers. Accordingly, users in one of the product survey layers are not offered surveys as often as users in a main survey layer. Additional ad-hoc layers can also be used, where users are offered custom surveys based upon various elements of demographic data associated with the users.

In one embodiment, one or more layers are divided into segments, each segment representing one day within the survey period. Each user within the layer is assigned to at least one segment. If a user logs in on their assigned day, the user is offered the opportunity to take a survey associated with that layer, which the user may decline. In one embodiment, the groups rotate through various layers of the survey pool that determine the type of survey offered.

In one embodiment, demographic information is used to construct one or more selectively sampled survey groups from users assigned to an ad hoc survey layer. When a new user joins the social networking system, the user creates a user profile, into which various details about the user are provided. For example, the user may provide his or her name, profile picture, city of residence, contact information, birth date, gender, marital status, family status, employment, educational background, preferences, interests, and other demographic information. Using the information users supply about themselves, among other information determined by the social networking system via the user's social network, survey creators can create ad hoc surveys that sample from the users assigned to one of the ad hoc survey layers. Surveys are offered to users that, for example, are known to use certain features of the social networking system, or are presumed to use certain types of products. Additionally, users are selected based on certain demographic characteristics, such as gender, age, geographic region, spoken language, etc. A user's eligibility for an ad hoc survey offering is determined by the creator of the ad hoc survey, however, the social networking system will limit the number of surveys offered to a single user within a period of time by applying a cool-down period to the user, in which the user is not offered additional surveys.

In one embodiment, a layer of unsurveyed users is maintained. The unsurveyed users can be used as a control group for surveying of the social networking system, to determine if surveyed users or unsurveyed users are more likely or less likely to use social networking system differently as a result of being offered, or not being offered surveys. In one embodiment, an unsurveyed layer is used as a control group, which is not surveyed. In one embodiment, the unsurveyed layer is used as a quarantine group, which groups of user rotate through after spending a period in an ad hoc survey layer. The quarantine layer will allow users that may have been heavily surveyed while in an ad hoc layer to spend a period in which they are not surveyed.

FIG. 1 illustrates an example network environment of a social networking system according to an embodiment. The social networking system 100 includes one or more data stores 101, each data store including one or more mass storage devices. In one embodiment, the social networking system 100 stores a social graph containing information on various users, including usage information and demographic information, as data objects stored in the data stores 101. The social networking system 100 may comprise one or more computing devices (e.g., servers) hosting functionality directed to the operation of the social networking system. One or more of data stores 101 may be operably connected to the social networking system's front end 120. A user of the social networking system 100 may access the social networking system 100 using one or more client devices 122, such as a desktop computer, mobile computer, smartphone, tablet computing device, or some other electronic device suitable for interaction with the social network.

The system front end 120 may interact with the one or more client devices 122 through a network 121, such as the Internet. For example, front end 120 may be implemented in software programs hosted by one or more computing devices of the social networking system 100, and the front end 120 may include web or Hypertext Transfer Protocol (HTTP) server functionality, or other network server functionality that allows users to access the social networking system 100. The one or more client devices 122 may execute one or more client applications, such as a web browser (e.g., Microsoft Windows Internet Explorer, Mozilla Firefox, Apple Safari, Google Chrome, Opera, etc.) or special-purpose client application, to access and view content over a computer network 121.

Network 121 represents a network or collection of networks the client devices 122 can use to access the social network system 100. The Network 121 can be the Internet, a corporate intranet, a virtual private network (VPN), a local area network (LAN), a wireless local area network (WLAN), a cellular network, a wide area network (WAN), a metropolitan area network (MAN), or a combination of two or more such networks)

Figure 2:
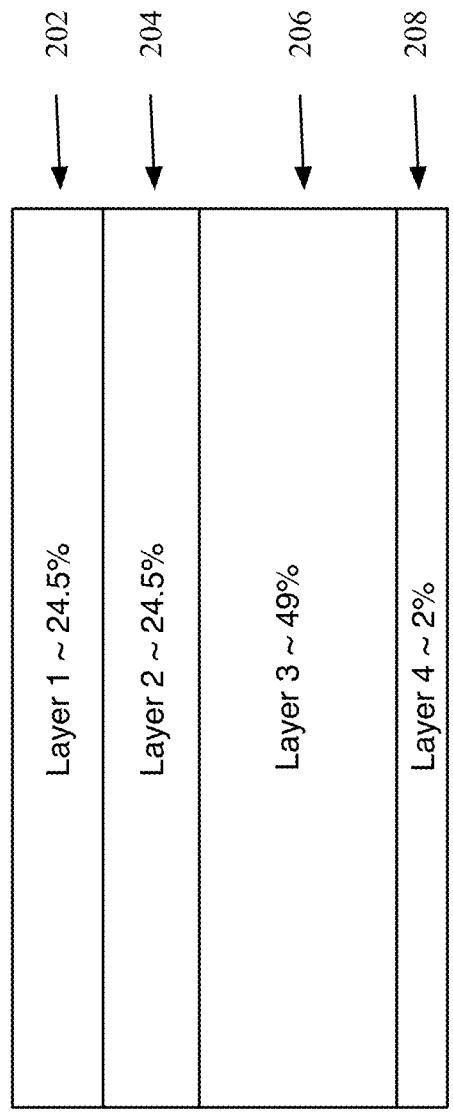
FIG. 2 is a block diagram of user survey layering according to an embodiment.

FIG. 2 is a block diagram of user survey layering according to an embodiment. The social networking system 100 stratifies users into survey layers of a survey pool based on a hash value derived from the user ID of the user. The number of logical survey layers used can vary between embodiments. In one embodiment, a large portion of the users on the social networking system 100 are hashed into three survey layers, while a small portion of the users are reserved as an unsurveyed control layer (e.g., layer 4 208). Surveyed layers include a first survey layer (e.g., layer 1 202) which, in one embodiment, is a main survey layer, a second survey layer (e.g., layer 2 204) which, in one embodiment, is a product survey layer, and a third survey layer (e.g., layer 3 206) which, in one embodiment, is an ad hoc survey layer. Layer 1 202 and layer 2 204 each make up approximately twenty-four point five percent (~24.5%) of the survey pool, while layer 3 206 makes up approximately forty-nine percent (~49%) of the survey pool. In one embodiment, the layer acting as a product survey layer (e.g., layer 2 204) can be sub-divided into multiple layers based on the product of the social networking system 100 that is currently being surveyed. Ad hoc survey layers can also be further subdivided into multiple layers, as a method to preserve data quality, so an embodiment can subdivide layer 3 206 into multiple sub-layers. The precise percentage of users within the survey pool assigned to any given layer can vary over time as users are added to the social networking system 100, so the percentages are for exemplary purposes, and are not limiting upon the various embodiments. Accordingly, the sizes of any of the layers 202-208 can vary, and the other layers can be adjusted accordingly.

The subject matter of the surveys offered in each layer corresponds to type of layer, and the layer arrangement described herein is meant to be exemplary and not limiting. In one embodiment, layer 1 202 is a main survey layer, and is used to gather data on user sentiment regarding tests or changes to the social networking system 100, or to gather general information on user satisfaction with the social networking system 100. Some segment of users assigned to the main survey layer are offered access to a new feature under test, and then offered a survey regarding the new feature. This survey information is compared to a control group, which continues to use the standard version of the feature on the social networking system 100, and which is offered a survey regarding the standard version of the feature.

For example, the social networking system 100 allows users to upload photographs, and share those photographs with the public, or with users who are members of the user's social network. When new features such as new photo sharing features are developed, some segment of the user population is granted access to the new features. After using the new features for some period, the user is offered a survey on that feature. A control group, which has continued to use the publically deployed version of the feature, is also offered a survey on the deployed version of photo sharing, and the results of the control survey are compared and analyzed in light of test group results, to determine the general user sentiment on the current and new version of photo sharing. The control group can be a segment of users from layer 1 202, or can be a segment of users from the layer 2 204.

In one embodiment, layer 2 204 is a product survey layer, and is used to gather user data on the various aspects, features, and functionality offered by the social networking system 100. A survey can be designed for each "product" of the social networking system 100, such a user profile, user photo albums, user status updates, etc. Users in the layer 2 204 product survey layer can be offered surveys targeted at one or more of these specific features, to gather user opinion on these features, as they are currently deployed. In one embodiment, survey data from layer 2 204 is analyzed as control group data, or in conjunction with control group data for a main survey layer. Users in a product survey layer or main survey layer are generally representative of the overall social networking populace, including users selected from multiple nations or multiple geographic locations, and from the multiple languages in which the social networking system 100 is available.

In one embodiment, a product survey layer is stratified into sub-layers based on the product addressed by the survey in question. For example, one group can be assigned to a layer based on a "Timeline" feature of the social networking system 100, while a second group is assigned to a survey group for a search feature, and one or more additional groups are assigned to photos, photo sets, or photo sharing features.

Ad hoc survey layers are used for custom surveys targeted based on user data. In one embodiment, layer 2 206 is an ad hoc survey layer, where approximately 49% of the users in the survey pool are assigned. Ad hoc survey layers can be subdivided into multiple layers. Users in the one or more ad hoc layers are selected for custom surveys based on various selection criteria, and each custom survey can have unique selection criteria. Users in the one or more ad hoc layers that are identified as users of a specific product, functionality, or interface of the social networking system 100 are offered surveys based on that specific product, functionality, or interface. For example, users of the Spotify digital music service may be offered surveys about the Spotify service. Users of the Instagram photo sharing service may be offered surveys about the Instagram service. In another example, users of a messenger service that is internal to the social networking system may be offered surveys about the messenger service. Additionally, users of the various client devices 122 are offered surveys on the interfaces to the social networking system 100 available on their particular client device. Product developers for the social networking system can also use one or more of the ad hoc layers for surveys on specific details of a product that do not warrant a full product survey layer survey.

Users can be selected for surveys based on a determined pattern of usage of the social networking system 100, or based on demographic information about the user, or various other selection criteria. For example, users can be offered a survey of political opinion, and survey responses can be reported, displayed, or analyzed based on various elements of demographic information, or other characteristics of the surveyed users. Additionally, product developers for the social networking system can use one or more of the ad hoc layers for demographically targeted custom surveys, to select users who speak a specific language, or users from a specific nation or geographic region.

Survey offerings are optional, and the survey layering system limits the number of surveys offered to any one user. In one embodiment, the social networking system selects a group of users that will be offered a survey on any given day. In one embodiment, once a user is assigned to be offered a survey, the user can be recruited for the survey regardless of whether the user has logged on to the social networking system. For example, the survey recruitment may be pushed to the user via a messaging system, such as via email, SMS, or instant messenger. In one embodiment conditioned upon login, if a selected user logs on while their select group is active, the user will be offered the opportunity to take a survey. The user may decline the survey offer, or the user may accept the survey offer. In this embodiment, if a user does not log in while that group of user IDs is active for the survey, the user will not be offered a survey. The number of surveys offered to a single user is limited; after a determined number of survey offers, the user will not be offered any additional surveys for a time. In other words, if a user is assigned to be offered a survey, regardless of whether or not the user is actually exposed to the survey recruitment, the user will not be offered any additional surveys.

In one embodiment, a fourth layer (e.g., layer 4 208) is reserved as a layer of unsurveyed users. The unsurveyed users can be used as a control group for surveying of the social networking system, to determine if surveyed users or unsurveyed users are more likely or less likely to use social networking system differently as a result of being offered, or not being offered surveys.

Figure 3:
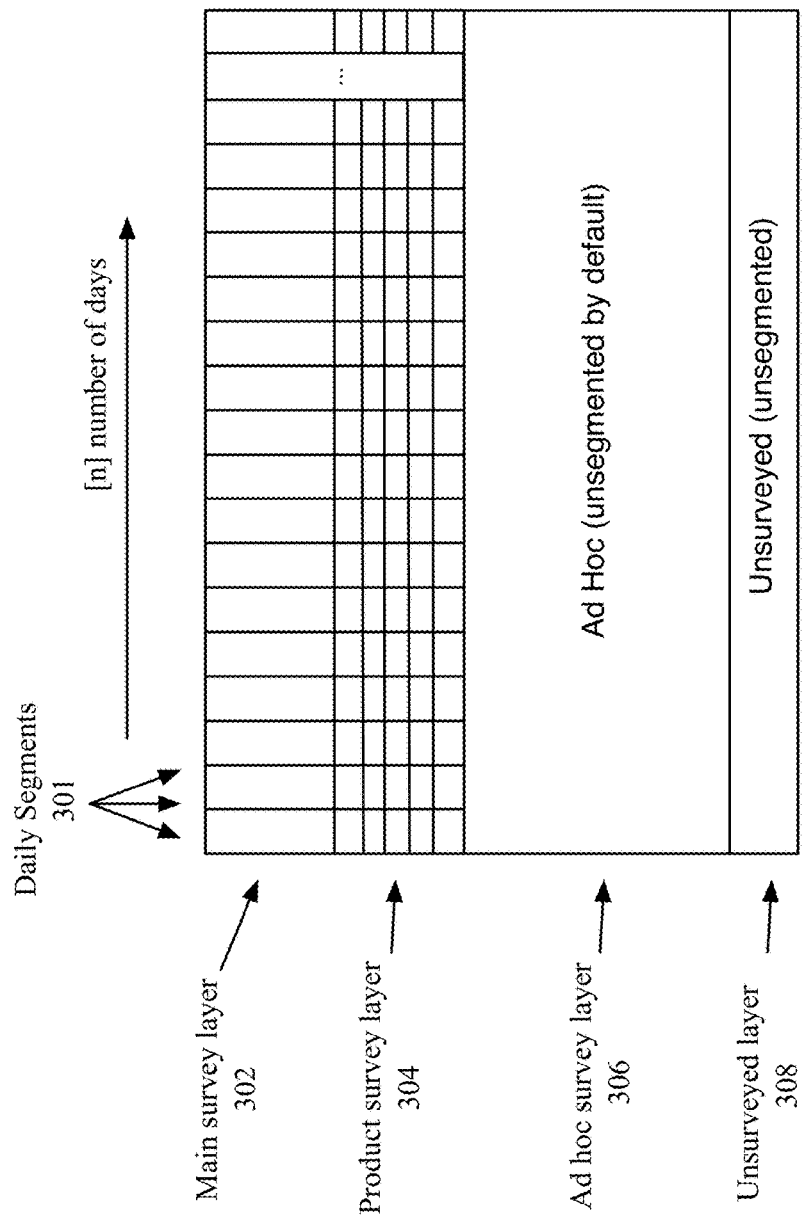
FIG. 3 is a block diagram of an example segmentation of the survey layers according to an embodiment.

FIG. 3 is a block diagram of an exemplary segmentation of the survey layers according to an embodiment. In one embodiment, daily segments 301 are created in a main survey layer 302 and a product survey layer 304. Users are assigned a layer based on a hash value of their user ID, and then assigned a daily segment. In one embodiment, daily segment 301 assignments are based on a random distribution. A layer can be divided in to [n] segments, one segment for each day during a period of up to n days, and the precise number of days for a segment can be adjusted by the social networking system 100. In one embodiment, the main survey layer 302 is divided into two hundred and fifty (250) segments for each of the 250 calendar days within a period, although greater or fewer days may also be used. The set of users that are placed within the main survey layer 302 are randomly assigned to a day segment. If a user logs on to the social networking system 100 on the survey day assigned to the user, the user is offered a survey with one or more questions. In one embodiment, once a user is assigned to be offered a survey, the user is not offered an additional survey for the remainder of the period, regardless of whether or not the user is actually exposed to the survey recruitment. If a user is offered a survey, the user may accept or decline the offer.

In one embodiment, the product survey layer 304 is also divided into daily segments 301. The number of daily segments 301 can be equal to, or in some instances, greater than or less than the number of days in which the main survey layer 302 is segmented. As with the main survey layer 302, the user ID of the various users of the social networking system 100 are hashed by a hash function, and a sub-set of users are assigned to the product survey layer 304 based on the hashed value of the user ID of each of the various users. In one embodiment, each product to be surveyed further stratifies the product survey layer 304, and users are assigned to a daily segment 301 that is specific to a particular product. In one embodiment, a single user is assigned a single day for a single product within a period of [n] days. In one embodiment, a user is assigned a daily segment 301 for multiple products within a period of [n] days.

The number of surveys offered to a single user within a single period is limited, to limit the over-surveying of users. If too many surveys are offered to a single user within a single period, the user experience of the social networking system 100 can be negatively impacted. Additionally in an over-surveyed user base, the quality of results returned by each survey can be negatively impacted. Users may begin to experience survey-fatigue, and the number of survey offerings may begin to decline over time. Data quality may be impacted if users do not exercise a standard degree of care or thoughtfulness when answering a survey. Data quality is also impacted if during the course of the survey, some users or demographic groups are over-sampled or under-sampled in relation to the sample distribution desired by the survey creator. The survey response group self-selects from the set of users that are offered the survey Ad hoc layers (e.g., ad hoc layer 306) are un-segmented by default. Once an ad hoc group has been assembled, however, a survey creator can segment the users in the ad hoc group into daily segments if that would suit the purpose of the survey. In one embodiment, the ad hoc layer 306 is sub-divided into multiple layers, each with a unique set of users. Third parties may contract with the social networking system 100 to offer targeted surveys to users in the one or more ad hoc layers 306, but the number and frequency of surveys offered to a single ad hoc layer 306, or a single ad hoc group within an ad hoc layer is limited by the social networking system 100. Custom survey creators are limited in their ability to over-survey users in the one or more ad hoc layers 306 by user cool-down periods enforced by the social networking system 100. Accordingly, once a user is offered a survey, the user will not be available to be surveyed again for some period of time determined by the social networking system 100, or by the user of the social networking system.

In one embodiment, dynamic re-sampling of the survey pool for an ad hoc survey is available to custom survey creators. As users submit survey responses during a survey period, the demographic information of the users that respond to the surveys can be analyzed. If it appears the survey responses over-sample one or more demographic groups, while under-sampling other demographic groups, the survey pool is adjusted to maintain the desired demographic sample group for the survey. For example, if the survey responses consist of a disproportionate number of male users of the social networking system, the number of surveys offered to men is reduced, while the number of surveys offered to women is increased.

Unsurveyed layers (e.g., unsurveyed layer 308) are not segmented, and users assigned to one or more of these layers are not offered surveys. In one embodiment, users in Unsurveyed layer 308 are considered outside of the survey pool and are used as a control group for the survey system. The unsurveyed users can used as a control group for the overall survey system of the social networking system 100, to determine, for example, whether the surveyed users or the unsurveyed users change the way in which they use the social networking system when surveying is enabled.

Figure 4:
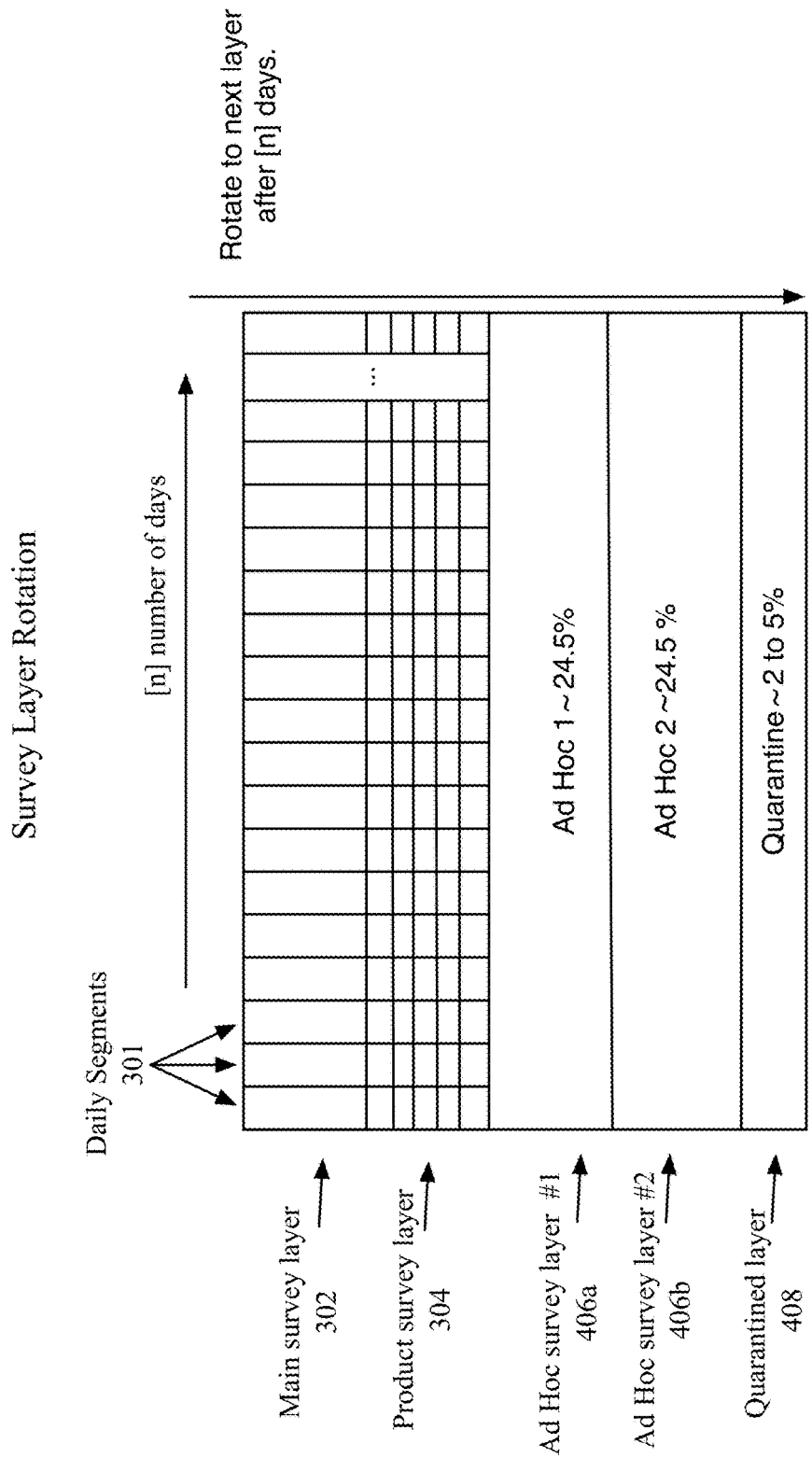
FIG. 4 is an illustration of an exemplary survey layer rotation according to an embodiment.

FIG. 4 is an illustration of an exemplary survey layer rotation. In one embodiment, the social networking system 100 utilizes a survey layer rotation system, where users are hashed into a first layer for a period of up to [n] number of days. After the users in the first survey are surveyed over a period of [n] days, all users currently in the first layer are re-assigned, or "rotate" into a second layer. For example, a user is assigned to the main survey layer 302 will remain with that layer for the duration of the main survey layer 302 survey period. Surveys are offered to users in each of the daily segments 301 within the main survey layer over a period of [n] days, and then the users in the main survey layer 302 are placed in one or more of the product survey layers 304 for a product survey period. In one embodiment, a sub-layer is used for each of the products surveyed, and a user passes through multiple product survey groups within the product survey layer 304 before the users are assigned to the next layer. In one embodiment, the duration of assignment of a single group of users to a single layer varies among layers.

One or more ad hoc layers 406 (e.g., ad hoc layer #1 406a, ad hoc layer #2 406b) are assigned users that are available for custom surveys. In one embodiment, custom surveys of a particular type, or from a particular source, are limited to a single one of the ad hoc layers 406 at a given time. For example, a user in ad hoc layer #1 406a will not be available to a custom survey that has access to a user in ad hoc layer #2 406b. In one embodiment, after a user spends a period in one ad hoc layer (e.g., ad hoc layer #1 406a), the user rotates to a second ad hoc layer (e.g., ad hoc layer #2 406b) if available. In one embodiment, after passing through all ad hoc layers 406, the user enters a Quarantine layer 408.

In one embodiment, users rotate through a Quarantine layer 408, during which the users are not offered any surveys. Approximately two to five percent of the survey pool may be in the quarantine period at any given time. An embodiment utilizing a Quarantine layer 408 differs from an embodiment using an unsurveyed layer, such as the Unsurveyed layer 308 of FIG. 3, in that users rotate into and out of the Quarantine layer 408, while users are assigned to, and remain in the Unsurveyed layer 308 for an indefinite period. In one embodiment, both a Quarantine layer 408 and an Unsurveyed layer 308 are used when surveying users on the social networking system 100. An Unsurveyed layer 308 is used as a survey control group, to determine if the usage patterns of users that are offered surveys differ from the usage patterns of users that are not offered surveys, while users within the survey pool also spend some period of time within the Quarantine layer 408 while rotating through the various layers of the survey pool.

Figure 5:
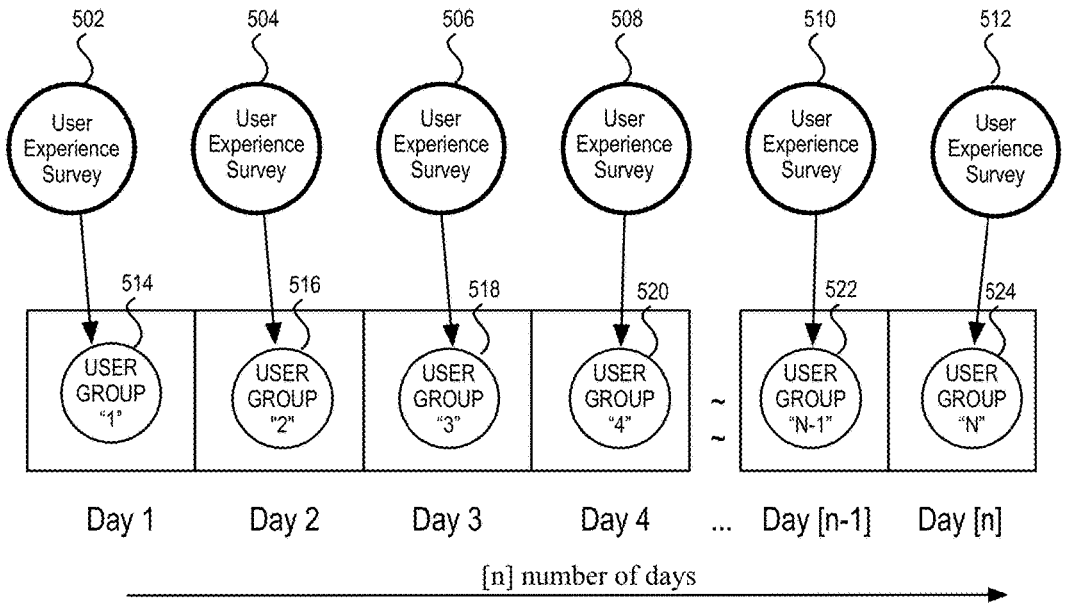
FIG. 5 is an illustration of exemplary segmentation in the main survey and product survey layer according to an embodiment.
Figure 5:
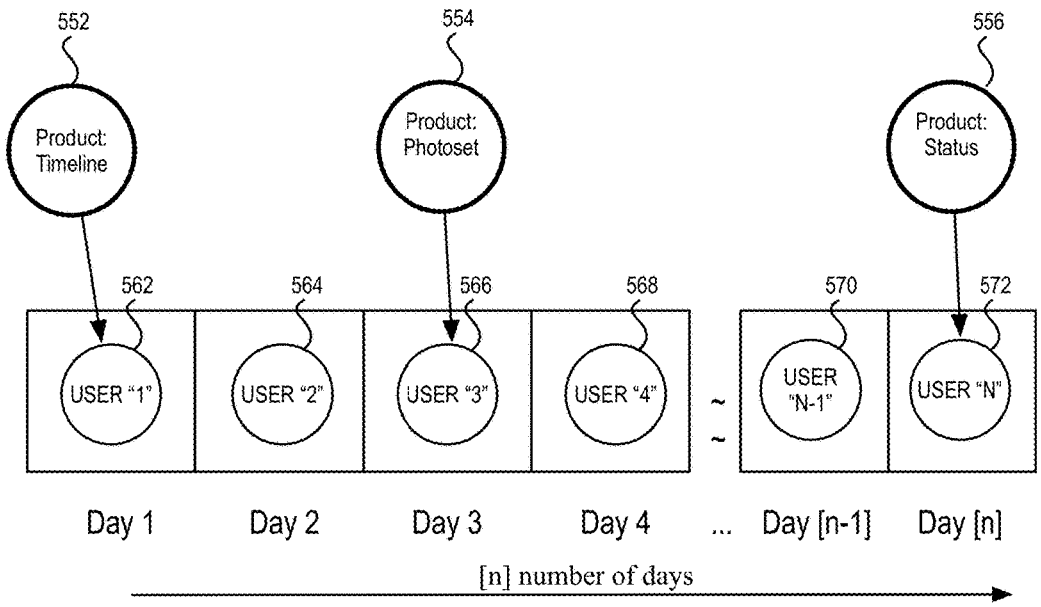

FIG. 5 is an illustration of exemplary segmentation in the main survey and product survey layers. The main survey layer 302 is used to gather data on user sentiment regarding tests or changes to the social networking system, or to gather general information on user satisfaction with the social networking system. The main survey layer 302 is configured to accommodate, e.g., a single, main survey, which is to be the primary survey as to general user sentiment of the user experience of the social networking system 100. In one embodiment, a key data quality driver is the ability to quantify user reactions to product tests as function of the user volume flowing through the primary survey, and other experimental frameworks at the social networking system 100. A survey experiment in the main survey layer 302 targets a randomly assigned user group, and if the group is of sufficient scale, some of the users with certain characteristics (e.g., users with particular patterns of use, of certain demographic categories, etc.) will be surveyed naturally through the main survey sample.

In the example illustrated, surveys are active in the main survey layer 302 to gather general user sentiment on the social networking system 100 via main survey layer segmentation, users are segmented by day based on a hash of the user ID of the user, and each user segmented will be assigned at least one survey on at least one day. In one embodiment, the set of users that are placed within the main survey layer 302 are assigned to a day segment using a random assignment. If a user logs on to the social networking system 100 on the day that is assigned to the user, the user is offered the opportunity to take a survey. If the user does not log on during the assigned day, then the user is not offered a survey for the remainder of the period. In one embodiment, if the user is assigned to be offered a survey, various channels (e.g., email, SMS, messaging) may be used to push the offer and/or survey to the user, regardless of whether or not the user is logged on the social networking system. When a user is offered a survey, the user may accept or decline the offer.

For example, on day 1, a user in the main survey layer 302, such as User Group "1" 514, is offered the opportunity to take a user experience survey 502, that is designed to gather user opinion from users about their overall satisfaction with the user experience of the social networking system 100. A group of users (e.g., User Group "1" 514) having various user characteristics is surveyed. The characteristics include particular patterns of use, such as length of time using the social networking system 100, or frequently used features of the social networking system. For example, some of the users in User Group "1" 514 have used one or more new features recently deployed on the social networking system 100, while some of the users have not, or some users in User Group "1" 514 may consistently use or consistently avoid certain features. The characteristics also include demographic data. For example, some of the users in User Group "1" 514 are English speakers, while some of the users speak one or more languages other than English. Given the large sample size of users in the main survey layer 302, the general sentiment of a cross section of the user populace is gathered over time.

Continuing the example, on day 2, an additional group of user experience surveys 504 are offered to an additional group of users, (e.g., User Group "2" 516) which may or may not have characteristics similar to those of other user groups, such as User Group "1" 514 or User Group "3" 518. By testing a large sample of users over one or more days, a spectrum of users having various characteristics are sampled within the main survey. Following in this manner, on day 3, an additional user experience survey 506 is offered to User Group "3" 518, while on day 4, User Group "4" 520 is offered a survey 508. This process can continue for each group of users for the survey period, through User Group "N−1" 522 and User Group "N" 524, where user-experience surveys (e.g., user experience survey 510, 512) are offered to users of varying characteristics to gather a general sense of user sentiment on the social networking system 100.

FIG. 5 also illustrates an exemplary manner in which users are randomly offered product layer 304 surveys. In one embodiment, product survey layer segmentation results in a survey-to-user correlation that is more targeted towards specific products, and in which users are offered surveys less frequently. In the illustration shown in FIG. 5, not all users and not all daily segments are assigned a survey when the layer is initially segmented, as users in the product survey layer 304 are offered fewer surveys in comparison to users in the main survey layer 302. In the exemplary illustration, on day 1, User "1" 562 is randomly offered a product survey 552 on the user's opinion of the "Timeline" product. On day 3, User "3" 566 is randomly offered a survey 554 to determine the user's opinion of the "Photoset" product. On day [n], User "N" 572 is randomly offered a survey to determine the user's opinion of the "Status" product.

While all users in the main survey layer 302 and product survey layer 304 are assigned to a daily segment, not all users or user groups are surveyed during each daily segment. Particularly, in the exemplary product survey layer illustration, User "2" 564, User "4" 568, and User "N−1" 570 are assigned to day segments during the exemplary product survey layer segmentation, however, no product surveys are offered to the user during that day segment. This may occur due to the random nature in which users groups or users are offered surveys in the main survey layer 302 and product survey layer 304. In one embodiment, users that are offered one or more surveys while the user is assigned to the main survey layer 302 are excluded from particular survey offerings while the user is in the product layer 304, to limit the degree of over-sampling for particular users. In one embodiment, users are assigned to date segments in a manner that takes into account the user cool-down period between survey offerings, and a user that is offered a survey at a later date in the main survey layer 302 will be assigned a date segment in the later days of the user's tenure in the product survey layer 304.

Figure 6:
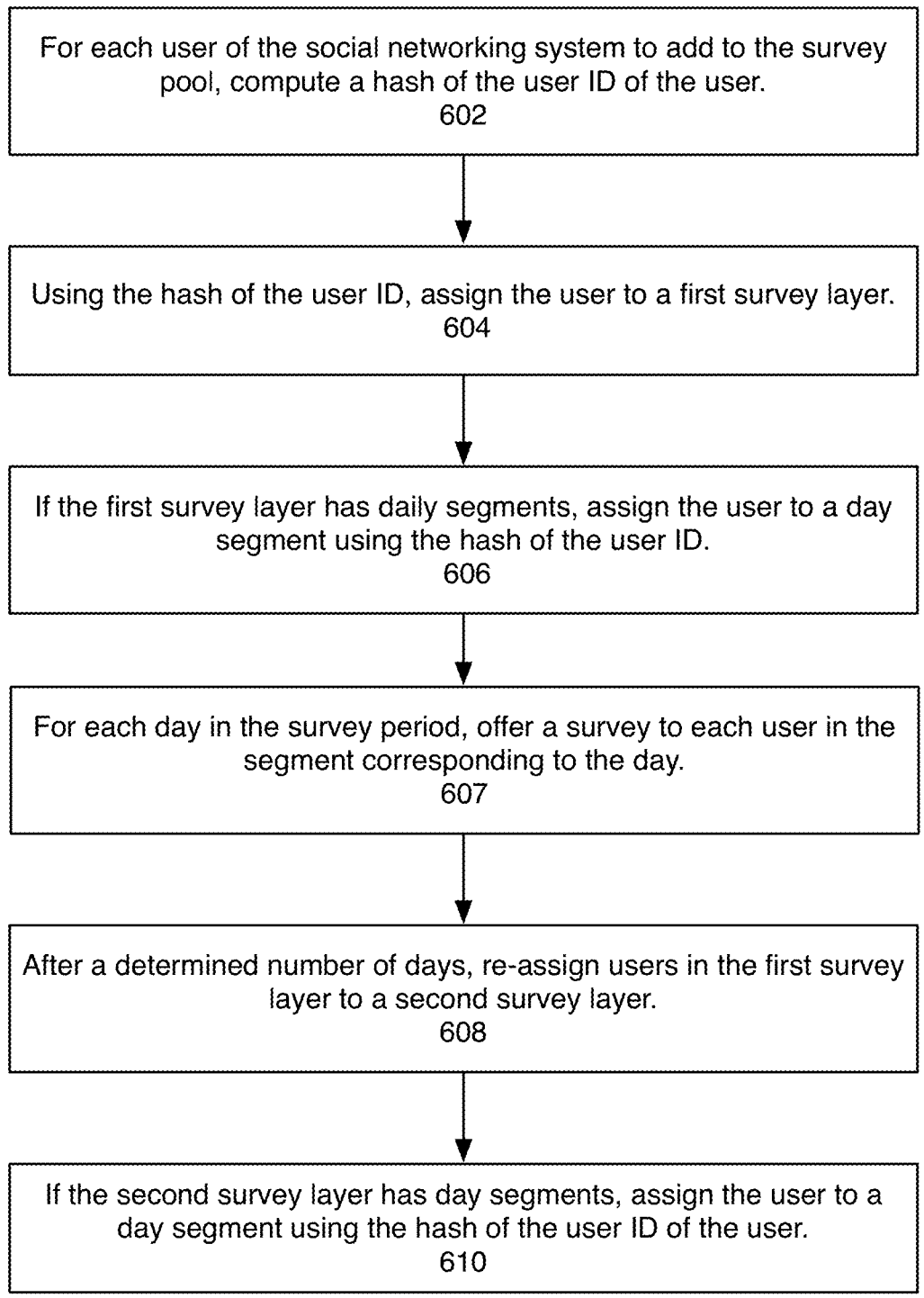
FIG. 6 is a flow diagram illustrating an exemplary method of creating survey segments and assigning users to the survey segments, according to an embodiment.

FIG. 6 is a flow diagram illustrating an exemplary method of creating survey segments and assigning users to the survey segments. At the beginning of a survey period, as shown at block 602, the social networking system 100 uses one or more hash functions to compute a hash value of the user ID of each user that will be added to the survey pool. At block 604, the social networking system 100 assigns the user to a first survey layer using the hash value computed by the one or more hash functions. At block 606, if the survey layer in question is segmented by day, such as the main survey layer 302, or product survey layer 304, the hash of the user ID of each user in the survey pool is used to assign the user to a day segment. During each day of the survey period, the users in the corresponding daily segment are offered the opportunity to take a survey, as shown at block 607. At block 608, after a determined period, users in the first survey layer are assigned to a second survey layer. The determined period can vary in length. In one embodiment, the period ranges between 100 and 300 days. An embodiment may also use a wider or narrower period based on various circumstances. As shown at block 610, if the second survey layer has day segments, the social networking system 100 assigns the user to a day segment using the hash value computed from the user ID of the user.

Figure 7:
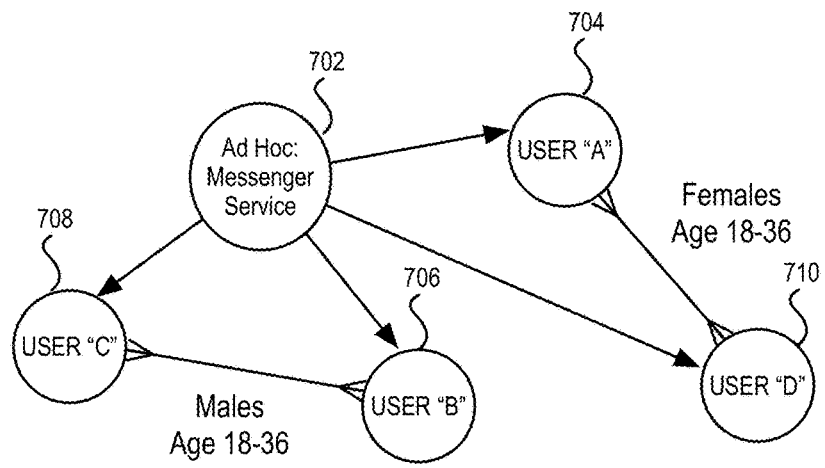
FIG. 7 is an illustration of an exemplary link between users and ad hoc surveys, according to an embodiment.
Figure 7:
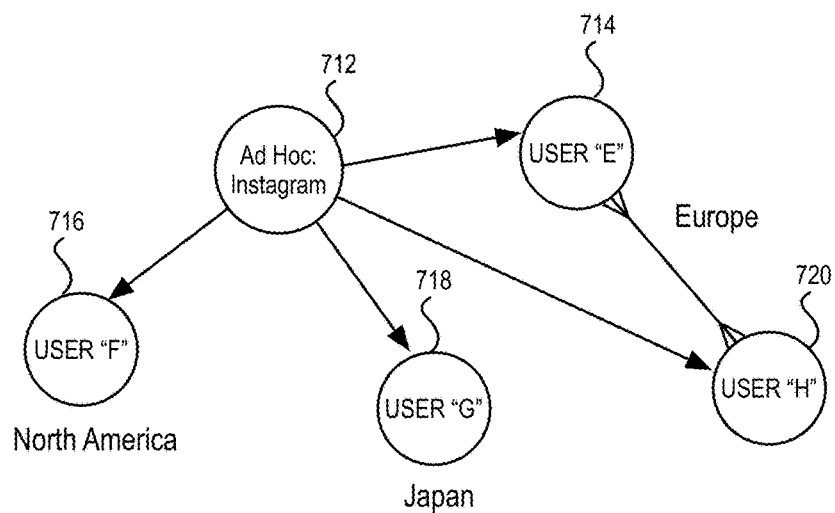

FIG. 7 is an illustration of an exemplary link between users and ad hoc surveys, according to an embodiment. A custom survey creator can create a survey as to a particular event, product, etc., and offer that survey to users in the one or more ad hoc layers 406. The survey creator may segment the survey offerings into daily segments, and run the survey over a period of days, or the survey creator may offer the survey to all available users at once. In one embodiment, multiple ad hoc layers 406 are used to limit the number of users available to a custom survey creator, for example, if the survey creator wishes to send a survey request to all eligible users at once. Additionally, the multiple ad hoc layers 406 may be used to provide a more specific pool of users within the users across the various ad hoc layers 406. For example, an ad hoc custom survey 702 on the messenger service may offer surveys to users in the ad hoc #1 layer

406*a*, while a custom survey 712 of users of the Instagram photo sharing service offers surveys to users in the ad hoc #2 layer 406*b*.

In some instances, it is beneficial to custom survey creators to have a survey pool that is representative of a given population, such as the general user base of the social networking system 100. It is also beneficial to enable survey creators to request a survey pool that is representative of the population of a given nation or geographic region. In some instances, a specific demographic group will provide the best survey data for a custom survey creator that is marketing a specific product to a specific group of people. In one embodiment, custom ad hoc groups are selected for a particular survey, or group of surveys, by grouping users with particular characteristics based on the set of users in one or all of the one or more ad hoc layers 406. The custom ad hoc groups can be defined to contain a representative sample of a given population, or can be demographically targeted at a specific type of user.

For example, for an ad hoc Messenger survey 702, the survey creator may be interested in gathering responses from a diverse group of users, but may be particularly interested in gathering a balanced number of responses from females (e.g., User "A", 704, and User "D" 710) and males (e.g., User "C", 708, and User "B" 706) between the ages of eighteen and thirty six. For various reasons, however, one or more demographic groups may be over-represented, or under-represented in the survey responses in relation to, for example, the demographics of the Messenger user base. After a survey period is complete, the survey results are weighted, to balance an over-representation or under-representation for a given group.

In addition to post hoc weighting, an embodiment of the social networking system 100 implements a dynamic re-sampling method during the run period of custom, ad hoc surveys, such that the survey offerings are dynamically adjusted during the survey period to maintain the desired sample distribution. For example, if a scenario arises such that User "C" 708 accepts an offer to take a survey, and the user completes the ad hoc Messenger survey 702, a statistically appropriate number of males between the age of 18 and 36 will have answered the survey. If the survey is currently under-sampling females between the age of 18 and 36, additional users in the under-sampled demographic group (e.g., User "A" 704, and User "D" 710) are offered the survey if those users have not previously declined to take that survey, or if the users have not previously completed a survey within the survey cool-down period.

Some users may express a desire to take a greater number of surveys than standard, and those users are able to request a lower than normal cool-down period between surveys. In one embodiment, users in a typically under-sampled demographic or geographic region that express an affinity for answering surveys have a shortened cool-down period in which the user will not be offered a survey. As an example, if a custom survey 712 is requesting user opinion on the Instagram photo sharing service is active, and the survey creator is attempting to gather results at least partially from users of the social networking system 100 who live in Japan. If a User "G" 718 lives in Japan, and frequently accepts offers to take surveys, or has otherwise requested or indicated an interest in answering surveys at higher than normal rate, User "G" 704 may be offered the Instagram survey 712 even if User "G" 704 has recently answered a different survey.

In one embodiment, once a target sample of a user group with particular social network demographic characteristics has been reached, the number of survey offers to that group is reduced. For example, if User "E" 714 in Europe and User "F" 714 in North America both accept and complete the ad hoc Instagram survey 712, and the survey goals are met for users in both North America and Europe, User "H" 720 in Europe may not receive a survey offer.

Figure 8:
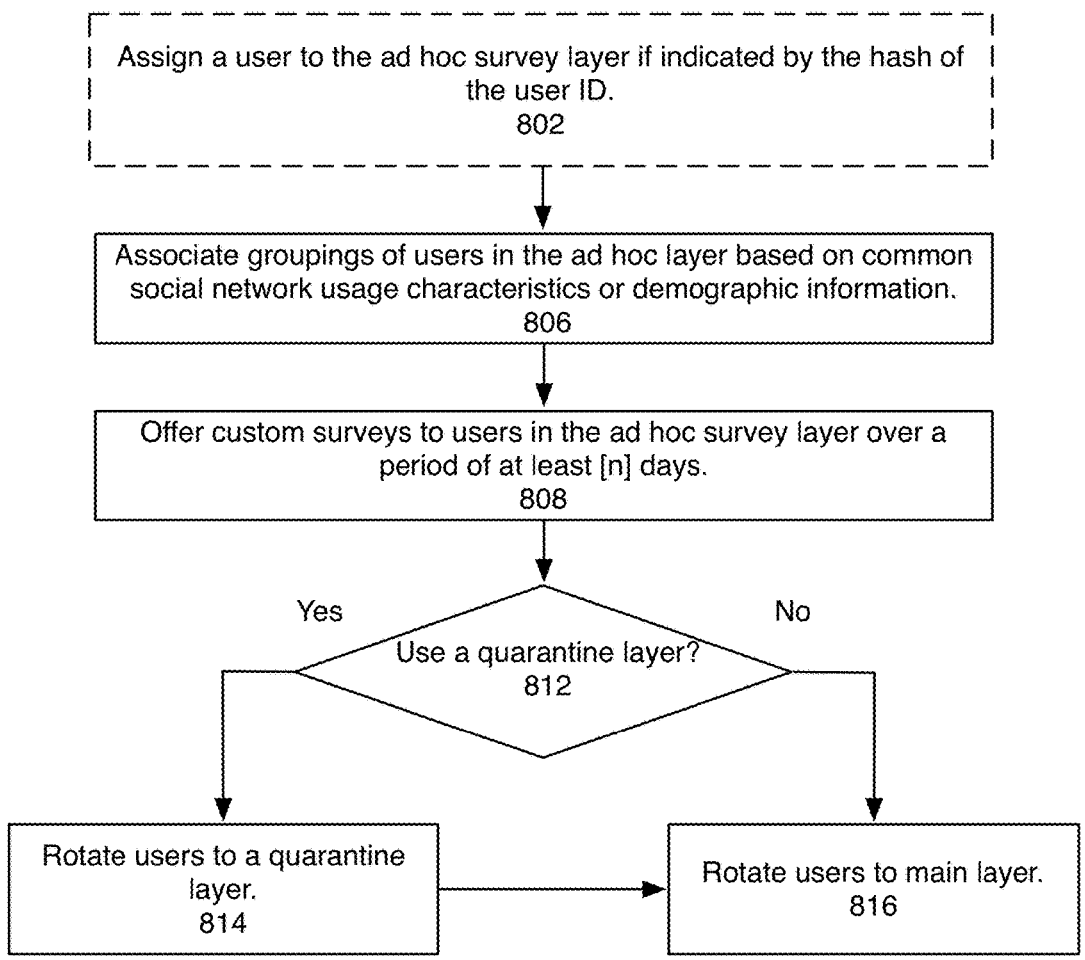
FIG. 8 is a flow diagram of a method of assigning users to one of the one or more ad hoc survey layers, and rotating the users out of the later after a period, according to an embodiment.

FIG. 8 is a flow diagram of a method of assigning users to one of the one or more ad hoc survey layers (e.g., a single ad hoc layer 306, or multiple ad hoc layers 406), and rotating the users out of the layer(s) after a period. In one embodiment, users are assigned to the ad hoc layer 306 after rotating from the product survey layer 304 to limit the ability of the more specialized surveys offered to users in the ad hoc layer 306 from priming the user's responses to more general surveys in the main survey layer 302 or product survey layer 304. If a user is asked a number of specific survey questions about a single aspect of the social networking system 100, the user may be primed to think in terms of the social networking system in terms of those specific aspects that were surveyed. This harms the quality of later results, as the user may not answer the more general survey questions in light of the social networking system 100 as a whole. For example, if a user spends a period in the ad hoc layer 306, and accepts a survey offer specifically about the user's opinion on the "photo sets" feature, the user is primed to give undue weight to considerations surrounding the photoset feature when considering questions about the overall social networking system 100. Under certain circumstances, the priming will alter the responses of a statistically significant number of users that when those users are later assigned to the main survey layer 302 or product survey layer 304.

Optionally, as shown at block 802, new users to the survey pool enter the survey pool at an ad hoc layer if the hash value of the user ID of the user indicates such an assignment, and if the social networking system allows users to begin in an ad hoc layer 406. In one embodiment, new users are not added directly to an ad hoc layer, and new users are instead added to a main survey layer 302 or a product survey layer, and subsequently rotate into the ad hoc survey layer 406. As shown at block 806, once a user is assigned to an ad hoc survey layer, groupings of users are associated based on common social network usage characteristics, or common demographic information. At block 808, custom surveys are offered to users in the ad hoc survey layer. In one embodiment, the users are assigned an ad hoc survey layer 306 for a period of [n] days. In one embodiment, the users cycle through [m] ad hoc survey layers 406 and spend [n/m] days in each ad hoc survey layer.

After [n] days, the social networking system 100 prepares to rotate all of the users assigned to the ad hoc survey layer 306, or the one or more ad hoc survey layers 406 into the next layer. If an unsurveyed control layer 308 is in use, which isolates a sub-set of users from the survey system, then the users in the survey pool rotate to the main survey layer 302, as shown at block 816. If a dynamic Quarantine layer 408 is used, as determined at block 812, then some portion of the users will rotate into the Quarantine layer 408, where no surveys will be offered to the user for a determined period, before the users rotate into the main survey layer 302, as shown at block 816. If a control group is maintained via an unsurveyed layer 308, then users proceed from an ad hoc layer (e.g., 306, 408) to the main survey layer 302, as shown at block 816.

Figure 9:
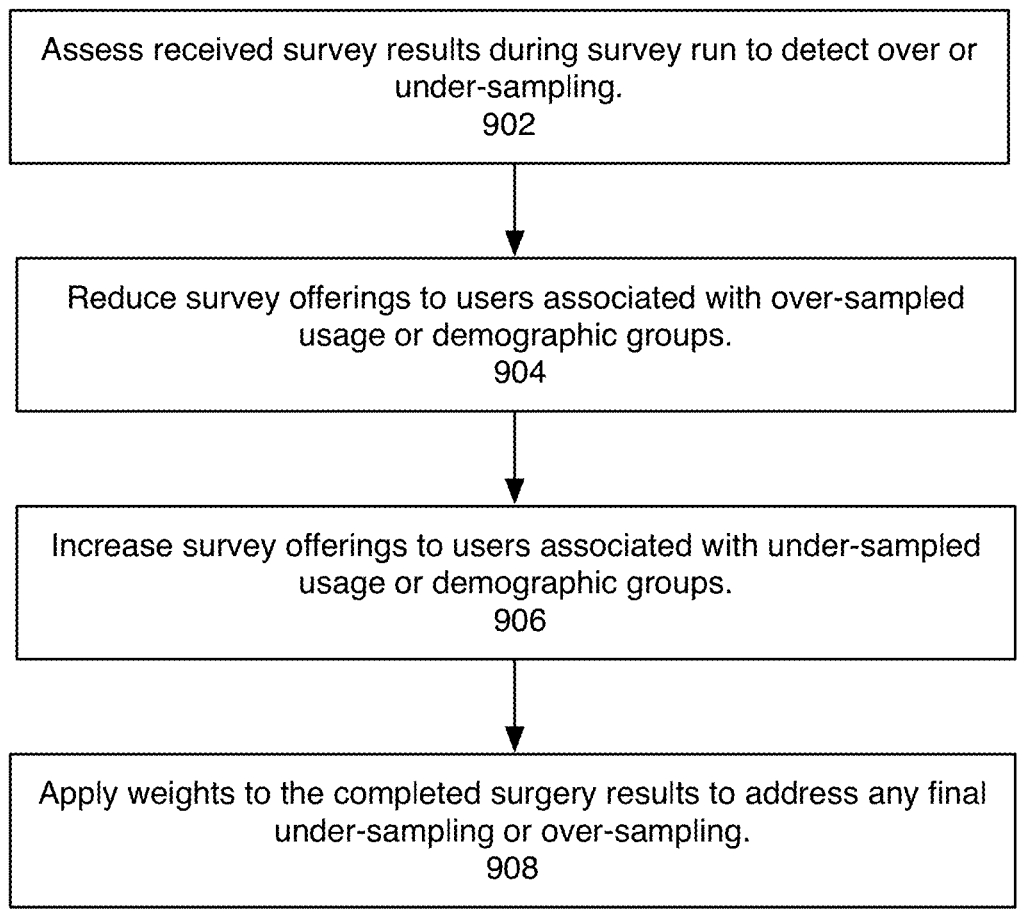
FIG. 9 is a flow diagram of a method of dynamic survey sampling for custom surveys according to an embodiment.

FIG. 9 is a flow diagram of a method of dynamic survey sampling for custom surveys according to an embodiment. Custom surveys are configured to survey users in an ad hoc survey layer 306 over a defined period. As shown at block 902, as survey results are collected, the responses from the various users are assessed to determine if one or more sample groups are deviating from the desired sampling distribution based in relation to targeted usage characteristics or demographic characteristics of the sampled users. As shown at block 904, the social networking system 100 reduces survey offerings to users associated with over-sampled demographic groups, to reduce the number of survey results that will be received in the upcoming period between the adjustment point and the end of the survey period for the survey in question. Likewise, the social networking system 100 increases survey offerings to users associated with under-sampled demographic groups, or users with under-sampled usage characteristics, as shown at block 906.

At block 908, any residual over-sampling or under-sampling remaining in the survey results that were not prevented by dynamic re-sampling can be adjusted by applying weights to the completed survey results, to address any final under-sampling or over-sampling of particular users, or groups of users.

Figure 10:
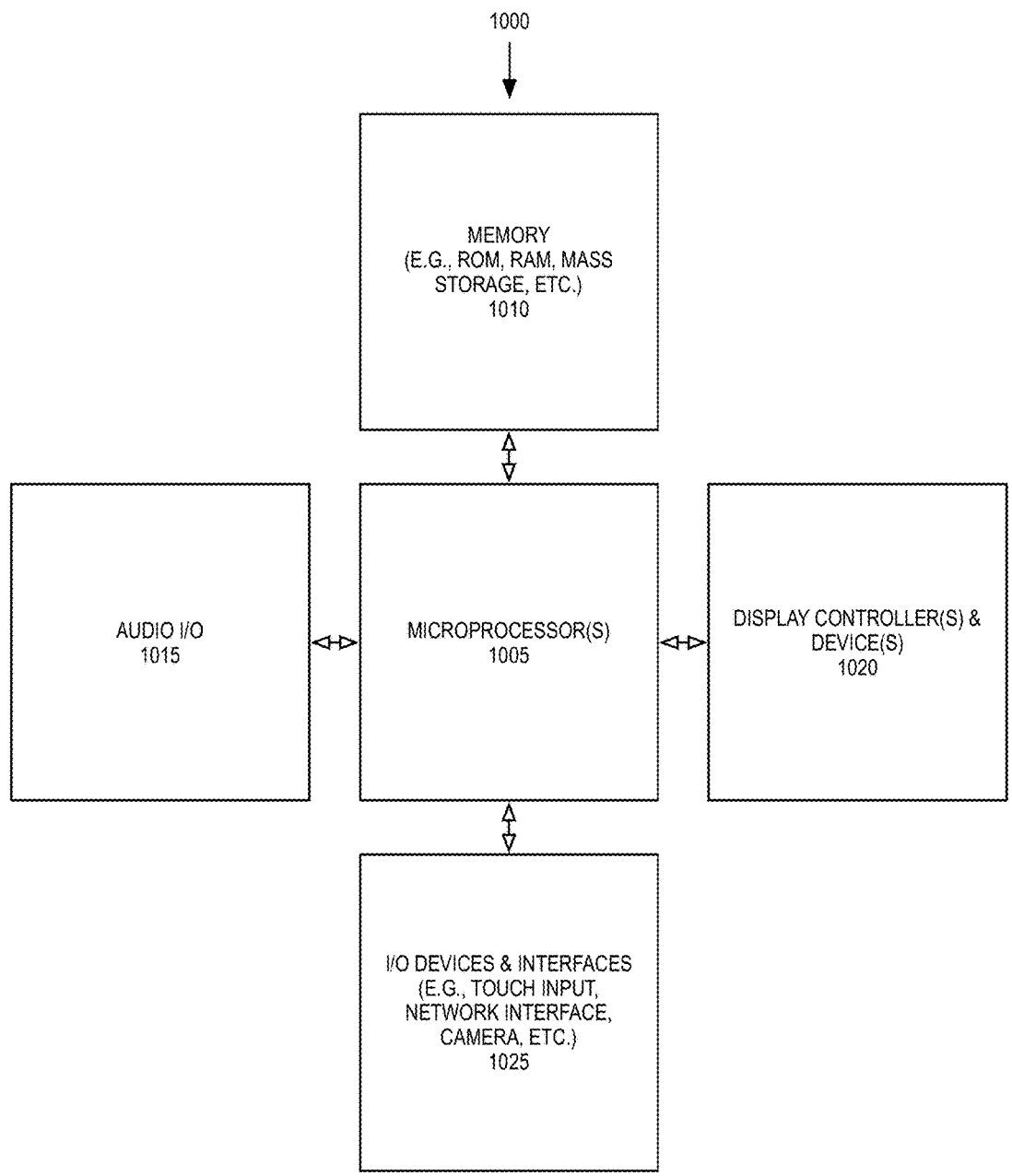
FIG. 10 illustrates a block diagram for an exemplary data processing system to provide social network functionalities according to an embodiment.

FIG. 10 illustrates a block diagram for an exemplary data processing system to provide social network functionalities according to an embodiment of the invention. The data processing system 1000 includes one or more microprocessors 1005 with one or more processor cores. Several connected system components (e.g., multiple connected chips) may be connected to the one or more processors 1005. Alternatively, the data processing system 1000 may be a system on a chip (SOC), where most or all system components reside on a single chip. The data processing system 1000 includes memory 1010, which is coupled to the one or more microprocessors 1005. The memory 1010 is used for storing data, metadata, and programs for execution by the microprocessors 1005. The memory 1010 includes one or more forms of volatile or non-volatile memories, such as Random Access Memory ("RAM"), Read Only Memory ("ROM"), a solid-state disk ("SSD"), Flash Memory, Phase Change Memory ("PCM"), or other types of data storage appropriate for use in the data processing system 1000. In one implementation of the data processing system 1000, the memory 1010 is stored internally to the system. Additionally, one or more forms of distributed memory may be used to supplement or replace the internally stored memory.

The data processing system 1000 includes an audio input/output subsystem 1015, which has at least one microphone, to audio input from a user, such as voice instructions. The audio input/output subsystem 1015 optionally includes one or more a speakers, to play music or some other audio, or to play audio notifications.

A display controller and attached display device 1020 provide a graphical user interface for the user, to interact with the data processing system 1000. The graphical user interface provides access to the social networking system 100 via a web browser, or via an interface provided by an application executing on the data processing system 1000.

The data processing system 1000 also includes one or more input or output ("I/O") devices and interfaces 1025, which are provided to allow a user to transfer data to and from the system data processing system, including input commands. The attached I/O devices 1025 include one or more input devices, such as a mouse, keypad or a keyboard, touch or multi-touch input panel, camera, or an optical scanner. The attached I/O devices 1025 can also feature one or more bi-directional input/output devices such as a network interface, modem, other known I/O devices, or a combination of such I/O devices.

The I/O devices and interfaces 1025 may also include a connector for a dock or a connector for a USB interface, Ethernet, FireWire, Thunderbolt, Lightning, etc. to connect the system 1000 with another device, external component, or a network. Exemplary I/O devices and interfaces 1025 also include wireless transceivers, such as an IEEE 802.11 transceiver, an infrared transceiver, a Bluetooth transceiver, a wireless cellular telephony and data transceiver (e.g., GSM, CDMA, WiMAX, LTE, LTE Advanced), or some other wireless protocol to connect the data processing system 1000 with another device, external component, or a network. One or more system buses or internal SOC buses may be used to interconnect the various components of the data processing system 1000.

The data processing system 1000 is an exemplary representation of one of the client devices 122 illustrated in FIG. 1, but one or more devices implementing the social networking system 100 may also utilize any of these features. For example, the data processing system 1000 may be a personal computer, a tablet computer, a smartphone, a network enabled media player, an entertainment system, a personal data assistance (PDA) or devices which combine aspects or functions of these devices, such as a media player combined with a PDA and a cellular telephone. Additionally, implementations of the data processing system 1000 can function as a network computer, a data server, or an embedded processing device within another device or consumer electronic product. As used herein, the terms computer, system, device, processing device, and "apparatus comprising a processing device" may be used interchangeably with the data processing system 100 and include the above-listed exemplary embodiments. It will be appreciated that additional components, not shown, may also be part of the system 1000, and, in certain embodiments, fewer components than that shown in FIG. 10 may also be used in a data processing system 1000.

Aspects of the various embodiments described may be embodied, at least partially, in software. That is, the computer-implemented methods may be carried out in a computer system or other data processing system in response to its processor or processing system executing sequences of instructions contained in a memory, such as memory 1010 or other non-transitory machine-readable storage medium. The software may further be transmitted or received over a network (not shown) via a network interface device 1025. In various embodiments, hardwired circuitry may be used in combination with the software instructions to implement the present embodiments. Thus, the techniques are not limited to any specific combination of hardware circuitry and software, or to any particular source for the instructions executed by the data processing system 1000.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system, including a networked computer system. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A non-transitory computer-readable medium storing instructions which, when executed by one or more processors in a processing device, cause the processing device to perform operations, the operations comprising:
    assigning a user of a communication system to a first survey layer of a survey pool having multiple logical survey layers, the assigning based on a hash value derived from a user identifier for the communication system that is associated with the user, at least one layer of the multiple logical survey layers being a control layer in which users assigned to the control layer are not offered surveys, a first survey type associated with the first layer of the multiple logical survey layers;
    sending, to a user device of the user, a message offering the user an option to take a survey associated with the first survey layer of the survey pool to which the user is assigned, the first survey layer of the survey pool corresponding to subject matter of a set of surveys offered to users assigned to the first survey layer of the survey pool; and
    assigning the user to a second survey layer of the survey pool after a period of time in the first survey layer, a second survey type associated with the second layer of the multiple logical survey layers.

2. The computer-readable medium of claim 1, further comprising assigning the user to a cool-down period after offering the user the option to take the survey, wherein the user is not offered the option to take additional surveys until the cool-down period expires.

3. The computer-readable medium of claim 2, further comprising segmenting a layer of the multiple logical survey layers into multiple segments, each segment corresponding to a day in a survey period.

4. The computer-readable medium of claim 3, wherein sending a message offering the user the option to take a survey includes:
    assigning the user to a logical segment of the segmented layer; and
    offering the user the option to take the survey after the user authenticates with the communication system on the day of the survey period corresponding with the segment.

5. The computer-readable medium of claim 3, wherein sending a message offering the user the option to take a survey includes:
    selecting the user from a plurality of users assigned to a single survey layer using survey selection parameters specific to the survey, the survey selection parameters to select users from the plurality of users based on characteristics of the user; and
    after selecting the user from the plurality of users, offering the user the option to take the survey after the user authenticates with the communication system.

6. The computer-readable medium of claim 5, wherein the survey selection parameters to select users from the plurality of users is based on usage characteristics of the user.

7. The computer-readable medium of claim 5, wherein the survey selection parameters to select users from the plurality of users is based on demographic characteristics of the user.

8. The computer-readable medium of claim 3, further comprising:
    determining if the communication system usage patterns of users that were sent the option to take the survey differ from the communication system usage patterns of users assigned to the control layer that were not offered the survey.

9. The computer-readable medium of claim 8, wherein the users that are assigned to a final survey layer in a series of layers of the survey pool are assigned to the first survey layer after the period of time.

10. A system comprising:
    a data store including one or more mass storage devices; and
    one or more computing devices coupled with the data store, to host functionality directed to operation of a communication system, the operation of the communication system including:
        assigning a user of the communication system to a first survey layer of a survey pool having multiple logical survey layers, the assigning based on a hash value derived from a user identifier for the communication system that is associated with the user, at least one layer of the multiple logical survey layers being a control layer in which users assigned to the control layer are not offered surveys, a first survey type associated with the first layer of the multiple logical survey layers; and
        sending, to a user device of the user, a message offering the user an option to take a survey associated with the first survey layer of the survey pool to which the user is assigned, the first survey layer of the survey pool corresponding to subject matter of a set of surveys offered to users assigned to the first survey layer of the survey pool; and
        assigning the user to a second survey layer of the survey pool after a period of time in the first survey layer, a second survey type associated with the second layer of the multiple logical survey layers.

11. The system of claim 10, wherein the data store includes communication system usage information and demographic information of users of the communication system, and wherein a user of the communication system is selected to be offered a survey based on the communication system usage information or demographic information of the user.

12. The system of claim 11, wherein a layer of the multiple logical survey layers is divided into multiple segments, each segment corresponding to one day in a survey period.

13. The system of claim 12, wherein the user is assigned to a segment, and the user is offered a survey if the user accesses the communication system on the day of the survey period corresponding to the segment.

14. The system of claim 13, further comprising:
determining if the communication system usage patterns of users that were sent the option to take the survey differ from the communication system usage patterns of users assigned to the control layer that were not offered the survey.

15. A computer-implemented method comprising:
assigning a user of a communication system to a first survey layer of a survey pool having multiple logical survey layers, the assigning based on a hash value of a user identifier for the communication system that is associated with the user, at least one layer of the multiple logical survey layers being a control layer in which users assigned to the control layer are not offered surveys, the first survey layer of the survey pool corresponding to subject matter of a set of surveys offered to users assigned to the survey layer of the survey pool, a first survey type associated with the first layer of the multiple logical survey layers;
sending a message offering the user an option to take a survey if the user is not in the control layer of the survey pool;
assigning the user a cool-down period after offering the user the option to take the survey, wherein the user is not offered the option to take additional surveys until the cool-down period expires; and
re-assigning the user to a second survey layer of the survey pool after a period of time in the first survey layer, a second survey type associated with the second layer of the multiple logical survey layers.

16. The computer-implemented method of claim 15, further comprising dividing a layer of the survey pool into multiple segments, each segment corresponding to a day in a survey period.

17. The computer-implemented method of claim 16, wherein offering the user the option to take a survey includes:
assigning the user to a segment of a multi-segmented layer of the survey pool; and
offering the user the option to take the survey after the user authenticates with the communication system on the day of the survey period corresponding with the segment.

18. The computer-implemented method claim 16, wherein offering the user the option to take a survey includes:
selecting the user from a plurality of users assigned to a single survey layer using survey selection parameters specific to the survey, the survey selection parameters to select users from the plurality of users based on characteristics of the user;
detecting access to the communication system by the user; and
offering the user the option to take the survey after detecting access to the communication system by the user.

19. The computer-readable medium of claim 1, further comprising:
modifying user access to a feature of the communication system, the feature being a subject of the survey associated with the survey layer to which the user is assigned.

* * * * *